United States Patent [19]

Gonia et al.

[11] Patent Number: 5,780,170
[45] Date of Patent: Jul. 14, 1998

[54] SYCHRONIZING RING HAVING A SINTERED FRICTION COATING

[75] Inventors: Detlev Gonia, Solingen; Marion Eckhardt, Possendorf/Boernchen; Lothar Schneider, Coswig, all of Germany

[73] Assignee: Sintermetallwerk Krebsöge GmbH, Radevormwald, Germany

[21] Appl. No.: 676,112

[22] PCT Filed: Jan. 7, 1995

[86] PCT No.: PCT/EP95/00054

§ 371 Date: Jul. 10, 1996

§ 102(e) Date: Jul. 10, 1996

[87] PCT Pub. No.: WO95/18877

PCT Pub. Date: Jul. 13, 1995

[30] Foreign Application Priority Data

Jan. 10, 1994 [DE] Germany .................. 44 00 431.1

[51] Int. Cl.$^6$ ............................................ B22F 7/02
[52] U.S. Cl. ............................................ 428/565; 428/548
[58] Field of Search ............ 75/228, 231; 428/565, 428/548

[56] References Cited

U.S. PATENT DOCUMENTS 3,853,572  12/1974  Herron et al. .
4,654,381  3/1987  Kang et al. .
5,370,725  12/1994  Kawamura et al. ............... 75/243

FOREIGN PATENT DOCUMENTS

| 0303809 | 2/1989 | European Pat. Off. . |
| 89727 | 5/1972 | Germany . |
| 7342680 | 11/1973 | Germany . |
| 4203321 | 8/1993 | Germany . |
| 2237029 | 4/1991 | United Kingdom . |
| 93/16207 | 8/1993 | WIPO . |

OTHER PUBLICATIONS

Romero, O.: "Clutch technology moves into gear boxes". In: Metal Powder Report, vol. 48, No. 6, Jun. 1993, UK, pp. 30–33.

*Primary Examiner*—Daniel J. Jenkins
*Attorney, Agent, or Firm*—Spencer & Frank

[57]  ABSTRACT

A synchronizing ring including a bearing ring comprised of sintered steel; and a friction coating provided on thee bearing ring and composed of a friction material which is sintered and which includes a matrix which is iron-based, from 0.5 to 10 percent by weight molybdenum in relation to the weight of the matrix, and from 20 to 50 percent by volume of graphite as a solid lubricant.

20 Claims, 3 Drawing Sheets

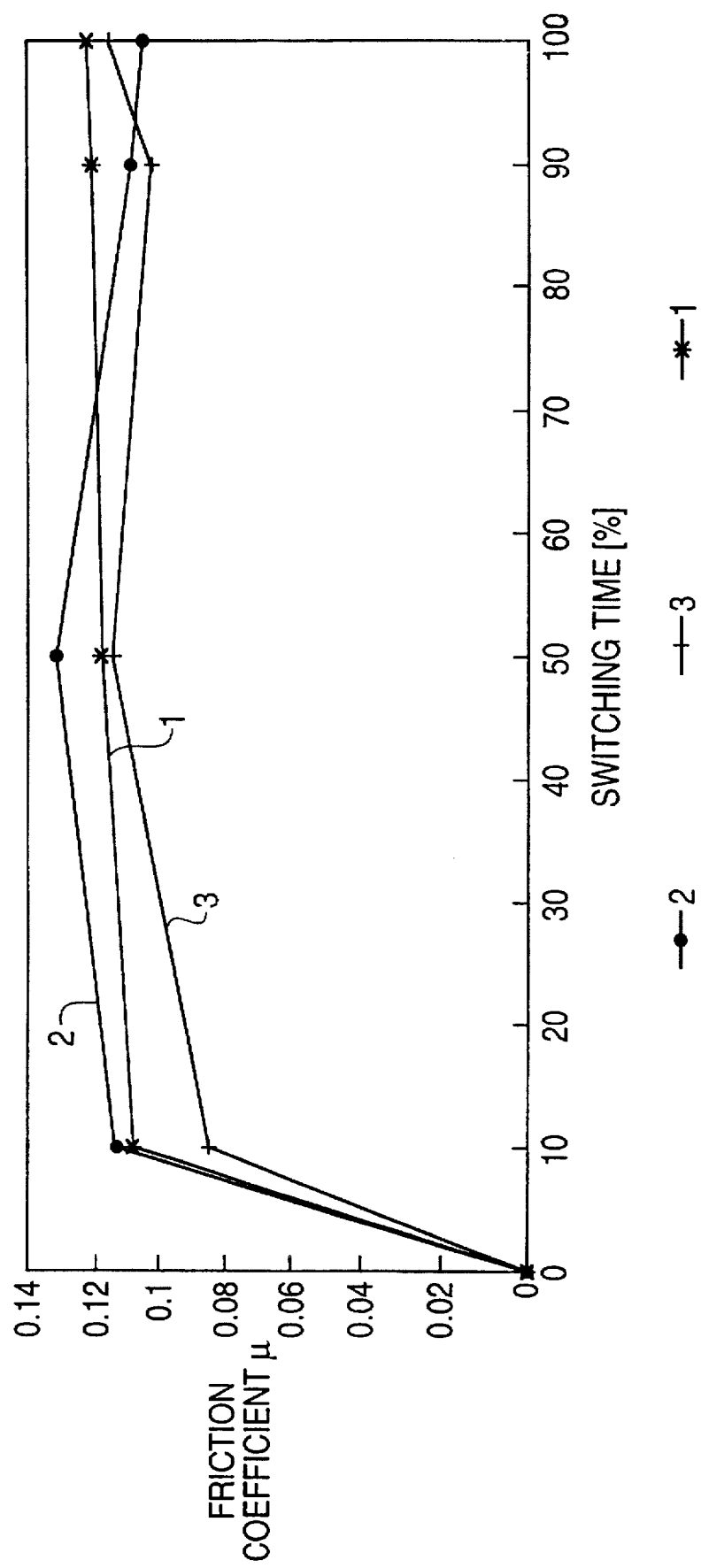

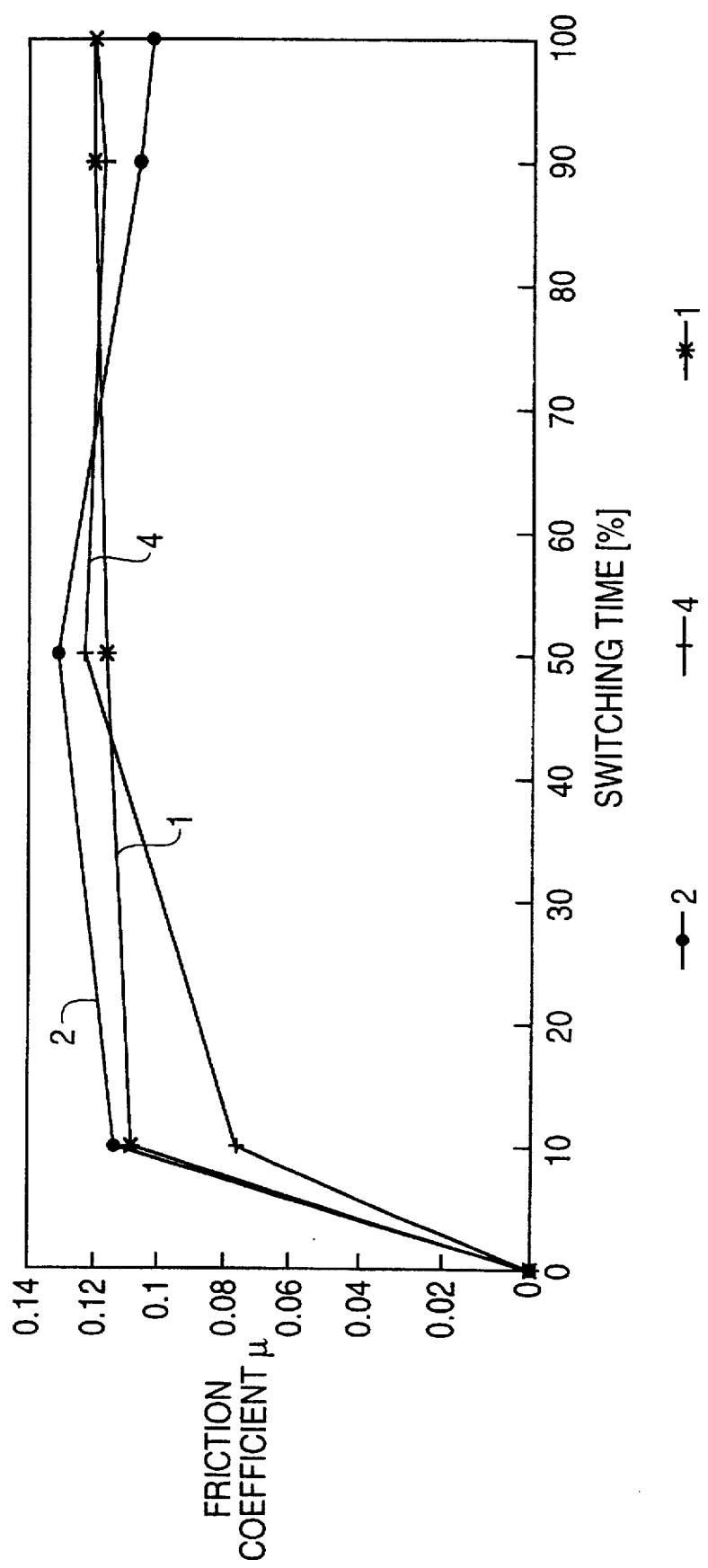

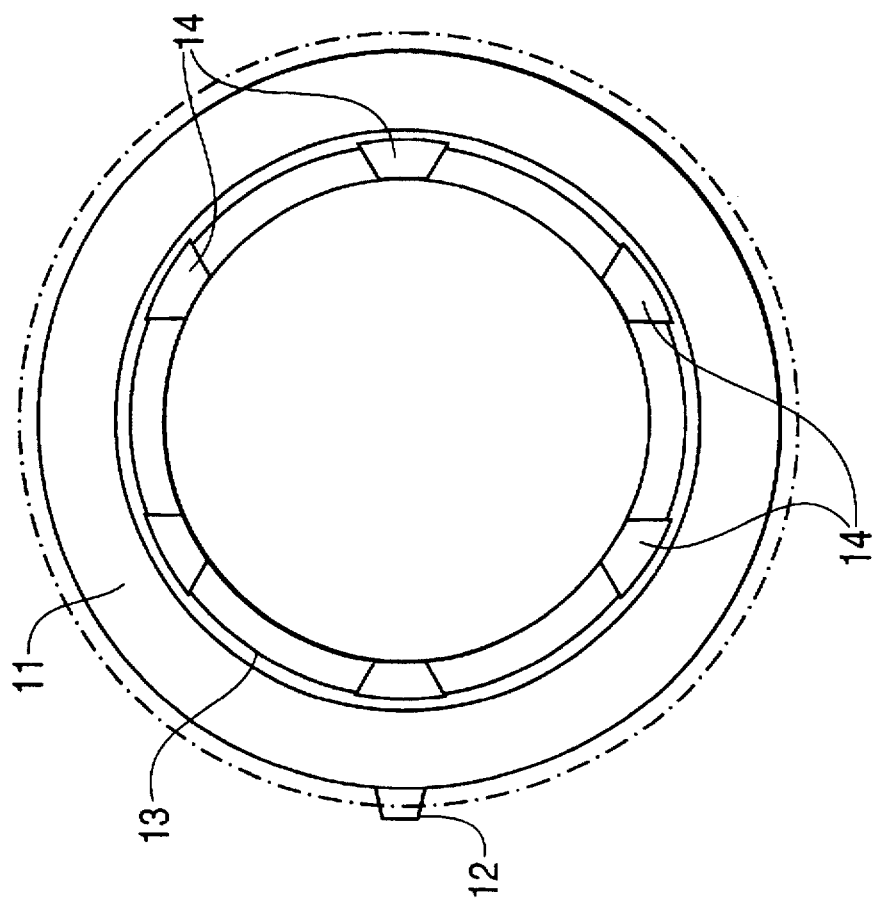
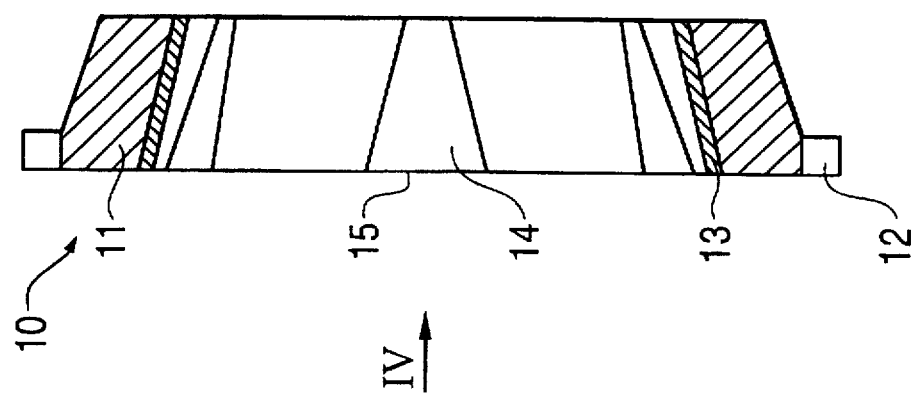

SYCHRONIZING RING HAVING A SINTERED FRICTION COATING

BACKGROUND OF THE INVENTION

1. Field of the Invention

The invention concerns a sintered friction material for the production of friction-linked components, in particular synchronizing rings, as well as a friction-linked component, especially a synchronizing ring, with a friction coating of this sintered friction material. In the following, reference is made primarily to a synchronizing ring, without this constituting a limitation.

2. Description of the Related Art

Synchronizing rings, e.g. for motor vehicle gear boxes, are subject to high stresses and have to meet a multitude of requirement. For sufficiently short shifting times, it is necessary that the friction coating of the synchronizing ring has a good frictional behavior. In addition, the synchronizing ring must have a sufficient mechanical and thermal stability. It is also practical if the friction coating is easy to process mechanically since the friction surface must be produced to fit exactly. For obvious reasons, these requirements generally cannot be met by one single type of material. Thus, it is common knowledge to manufacture synchronizing rings in two layers, so that the friction coating layer is designed for favorable friction conditions while the material serving as a carrier, has a high mechanical and/or thermal stability.

From DD-PS 89 727, we are familiar with a friction component for oil flow, for example a synchronizing ring, which is produced with the powder-metallurgy method from an iron powder to which powdered nickel, copper, lead as well as graphite are added. The use of lead can result in considerable danger to the health during production as well as when the friction component is in use. In addition, because of the comparatively low graphite content, it has turned out that this material has a tendency to show strong signs of adherence, particularly under high stresses, which manifest themselves in the form of an uneven moment build-up and scoring.

From DE-GM 73 42 680, a synchronizing ring of sintered steel is known, which has a thin injection-molded coating of molybdenum as friction surface. On the one hand, molybdenum as injection-molding material is an expensive material and, on the other, the synchronizing ring generally must be ground to fit the required surface dimensions. As a result of the high degree of hardness of the molybdenum coating, this generally results in high tool wear.

From DE-OS 42 03 321, a sintered friction material for friction-linked components, in particular synchronizing rings, is known, which has a graphite share of 15–30 percent by volume and which contains, among other things, ceramic components. To be sure, a synchronizing ring with such a friction coating does exhibit the desired friction behavior. However, it cannot be ruled out that strong signs of abrasion will occur on the clutch as a result of the share of ceramic components. If applicable, this can also lead to an uneven momentum build-up.

It is the object of the invention to create a sintered friction material for friction-linked components, a material showing good friction behavior without the herewith connected disadvantages of the initially described kind.

SUMMARY OF THE INVENTION

The solution according to the invention is a sintered friction material with an iron-based matrix and a solid lubricant, which contains 0.5 to 10 percent in weight molybdenum in relation to the matrix, and 20–50 percent in volume graphite as solid lubricant. In one embodiment according to the invention, the molybdenum content can be 1 to 5 percent in weight preferably 1 to 2 percent in weight. It can be useful if the graphite content is 25 to 45 percent in volume. The component parts here can contain production-related and/or unavoidable impurities.

Surprisingly, it has turned out on the one hand that mixing a sintered metal material, generally used as a construction material, with a high share of solid lubricant has the desired friction qualities. On the other hand, signs of adhesion and abrasive wear of the friction surface of the clutch are avoided for the most part, even with high stress or excess stress because of the high solid lubricant content. The fact that the sintered friction material according to the invention has a high moldability has turned out to be another advantage. It is therefore possible that during the production of the synchronizing ring with the powder-metallurgy method, the ring can be calibrated following the sintering process, as a result of which the possibly required, subsequent machining to obtain an exact-fitting friction surface can be reduced.

One suitable embodiment of the invention provides that the matrix consists at least in part of an iron powder completely alloyed with molybdenum. In another embodiment of the invention, it can be provided that the matrix consists at least in part of an iron powder partially alloyed with molybdenum. Both embodiments have the advantage that in order to provide the sintered metal powder to be processed, molybdenum must not be added in its free form, thereby making it easier to handle the matrix powder.

The invention furthermore concerns a friction-linked component, in particular a synchronizing ring, with a carrier and a friction coating made of a sintered friction material of the initially described type. As a rule, synchronizing rings are used in gear lubricated with oil. It is therefore unavoidable that the counterrotation surface of the clutch on the one hand, and the friction coating surface of the synchronizing ring on the other, are moistened with oil prior to the switching operation. For that reason, it is a known practice to provide the friction surface of the synchronizing rings with grooves so that the oil can be discharged. A high expenditure is required to produce such grooves, depending on the material for the friction coating.

Providing brass synchronizing rings with circulatory grooves, for example, is well-known. Basically, such grooves can be produced through machining only, something that can easily be done with brass rings. With synchronizing rings manufactured with the aid of the powder-metallurgy method, it makes sense to provide grooves in axial direction. This is particularly advantageous since the axial grooves can be formed during the molding process already. However, in general it is required that the effective friction surface is reworked through machining. Until now, it was very difficult to provide for grooves in the axial direction or circular grooves in molybdenum-containing friction coatings, on the one hand because the machining, in particular the production of circular grooves, of such friction coatings results in excessively high expenditure. Grooves in the axial direction basically can be incorporated during the molding process, and the friction surface, including the groove surfaces, can be covered with an injection coating of molybdenum. However, the necessary reworking through machining is here tied to increased expenditure as well.

It has turned out, however, that despite the high molybdenum content, the sintered friction material according to the invention can be calibrated with sufficient accuracy, following the sintering process. Thus, according to the invention, it is possible to provide for grooves in the axial direction on the friction surface of the friction-linked component with a friction coating according to the invention, which grooves can be formed during the molding process. In one embodiment of the invention, it is provided that the grooves on the friction surface have a trapezoidal shape. Trapezoid grooves can also be formed without problem during the molding process of the powder-metallurgy method. The grooves with trapezoidal shape have the advantage of permitting a better oil discharge from the respective surfaces.

It makes sense if the friction-linked component according to the invention is also designed as multi-layer component, wherein the carrier for the friction coating may consist of sintered steel. This has the advantage that only a thin coating of the comparably expensive friction coating must exist on the synchronizing ring. Such a multi-layer synchronizing ring, for example, is manufactured in the composite method.

BRIEF DESCRIPTION OF THE DRAWINGS

The invention is now explained in more detail with the aid of the embodiments and the coordinated diagrams, as well as the drawing. Shown are in:

FIG. 1 The dependence of friction coefficient µ on the switching time with a friction coating according to embodiment 1 of the invention;

FIG. 2 The dependence of friction coefficient µ on the switching time with a friction coating according to embodiment 2 of the invention;

FIG. 3 A sectional cut of a synchronizing ring and

FIG. 4 The view in the direction of arrow IV, according to FIG. 3.

DESCRIPTION OF THE PREFERRED EMBODIMENTS

Embodiment 1:

A sintered friction coating with the following components was produced:

matrix: 60 percent in volume graphite: 40 percent in volume molybdenum: 1.5 percent in weight in relation to the matrix The measurement shown in FIG. 1 was taken during a surface pressure of $4N/mm^2$ and a frictional speed of 5 m/s. The friction gradient for the friction coating with this composition carries the reference sign 1 in the diagram. Shown for comparison are the friction gradient 2 of a synchronizing ring, which has an injection-molded coating of molybdenum with circular grooves as friction coating, and the friction gradient 3 of a synchronizing ring, which has a friction coating consisting of a phosphorous-alloyed iron matrix with 20 percent in volume graphite and 10 percent in volume ceramic components. As can be seen from the diagram, the friction gradient 1 is comparable to friction gradient 2 (injection-molded coating of molybdenum), which is considered a favorable friction gradient. However, the friction material according to Example 1 is much easier to handle and, as a result of the high graphite content, there is no danger of signs of adhesion and/or an abrasive wear of the clutch during high stress. The synchronizing ring, having a friction coating with ceramic components, has a less favorable friction gradient 3, and there is danger of signs of abrasive wear during excess stress.

Embodiment 2:

A sintered friction material, consisting of the following components, was produced:

matrix: 77 percent in volume graphite: 23 percent in volume molybdenum: 1.5 percent in weight in relation to the matrix The friction behavior of this friction material was also tested for a surface pressure of $4N/mm^2$ and a friction speed of 5 m/s. In FIG. 2, the friction gradient of this friction coating carries the reference number 4. For a comparison, the curve courses 1 and 2 for a friction material according to embodiment 1 or for an injection-molded coating of molybdenum are also shown. At the start of the switching time, the friction material according to embodiment 2 has a worse friction coefficient than the friction material according to embodiment 1. This can be attributed to the fact that the friction material according to embodiment 1 has a higher porosity due to the higher solid lubricant content, thus making it easier to displace the oil on the surface. At the end of the switching time, the friction material according to embodiment 1, as well as the friction material according to embodiment 2 have nearly identical friction coefficients. An abrasive wear of the counterrotation surface or signs of adhesion are largely avoided with this friction material as well because of the high solid lubricant content.

The synchronizing ring 10, shown in FIGS. 3 and 4, has an outer bearing ring 11 with a toothing 12. The bearing ring 11 can, for example, be manufactured of sintered steel. The friction coating 13 of the synchronizing ring, which is coordinated with the clutch, consists of a sintered friction material of the type described initially. Such a synchronizing ring can, for example, be manufactured in the composite method. In general, the friction surface for such a synchronizing ring 10 has a conical shape. For the embodiment shown in the drawing, the friction surface has trapezoidal grooves 14 in axial direction. In order to be able to form the trapezoidal grooves during the molding cycle of the sintered metal powder, the wider end 15 of a trapezoid groove 14 is coordinated with the greater diameter for the conical friction surface of synchronizing ring 10.

As a result of the trapezoidal shape of grooves 14, the oil is stripped from the friction surface by edges that are not vertical to the rotational direction, which favors the oil discharge. Furthermore, the symmetrical design of the trapezoid grooves 14 prevents the rotational direction from having an effect on the friction behavior and the oil discharge.

What is claimed is:

1. A synchronizing ring, comprising:

a bearing ring comprised of sintered steel; and a friction coating provided on the bearing ring and comprised of a friction material which is sintered and which comprises a matrix which is iron-based, from 0.5 to 10 percent by weight molybdenum in relation to the weight of the matrix, and from 20 to 50 percent by volume of graphite as a solid lubricant.

2. The synchronizing ring according to claim 1, wherein the molybdenum has a content which ranges from 1 to 5 percent by weight.

3. The synchronizing ring according to claim 1, wherein the molybdenum has a content which ranges from 1 to 2 percent by weight.

4. The synchronizing ring according to claim 1, wherein the graphite has a content which ranges from 25 to 45 percent by volume.

5. The synchronizing ring according to claim 1, wherein the graphite has a content which ranges from 35 to 45 percent by volume.

6. The synchronizing ring according to claim 1, wherein the matrix comprises at least in part an iron powder which is completely alloyed with the molybdenum.

7. The synchronizing ring according to claim 1, wherein the matrix comprises at least in part an iron powder which is partially alloyed with the molybdenum.

8. The synchronizing ring according to claim 1, wherein the ring has an axial direction, and wherein the synchronizing ring further comprises grooves arranged in the axial direction on the surface of the friction coating.

9. The synchronizing ring according to claim 8, wherein the grooves have a trapezoidal shape.

10. The synchronizing ring according to claim 1, wherein the friction coating consists essentially of the friction material.

11. The synchronizing ring according to claim 1, wherein the friction coating consists essentially of the friction material which consists essentially of a matrix which is iron-based, from 0.5 to 10 percent by weight molybdenum in relation to the weight of the matrix, and from 20 to 50 percent by volume of graphite as a solid lubricant.

12. The synchronizing ring according to claim 1, wherein the friction coating has a smooth surface.

13. The synchronizing ring according to claim 12, wherein the friction coating is calibrated.

14. A synchronizing ring, comprising:

a bearing ring comprised of sintered steel; and a friction coating provided on the bearing ring and consisting essentially of a friction material which is sintered and which consists essentially of a matrix which is iron-based, from 0.5 to 10 percent by weight molybdenum based on the weight of the matrix, and from 20 to 50 percent by volume of graphite as a solid lubricant, wherein the matrix comprises at least in part an iron powder which is at least partially alloyed with the molybdenum.

15. The synchronizing ring according to claim 14, wherein the matrix comprises at least in part an iron powder which is completely alloyed with the molybdenum.

16. The synchronizing ring according to claim 14, wherein the molybdenum has a content which ranges from 1 to 5 percent by weight.

17. The synchronizing ring according to claim 14, wherein the molybdenum has a content which ranges from 1 to 2 percent by weight.

18. The synchronizing ring according to claim 14, wherein the graphite has a content which ranges from 35 to 45 percent by volume.

19. The synchronizing ring according to claim 14, wherein the ring has an axial direction, and wherein the synchronizing ring further comprises grooves arranged in the axial direction on the surface of the friction coating.

20. The synchronizing ring according to claim 19, wherein the grooves have a trapezoidal shape.

* * * * *